Aug. 21, 1962  W. R. KOEHN  3,050,066
RETENTION CATHETERS
Filed Dec. 31, 1958  2 Sheets-Sheet 1
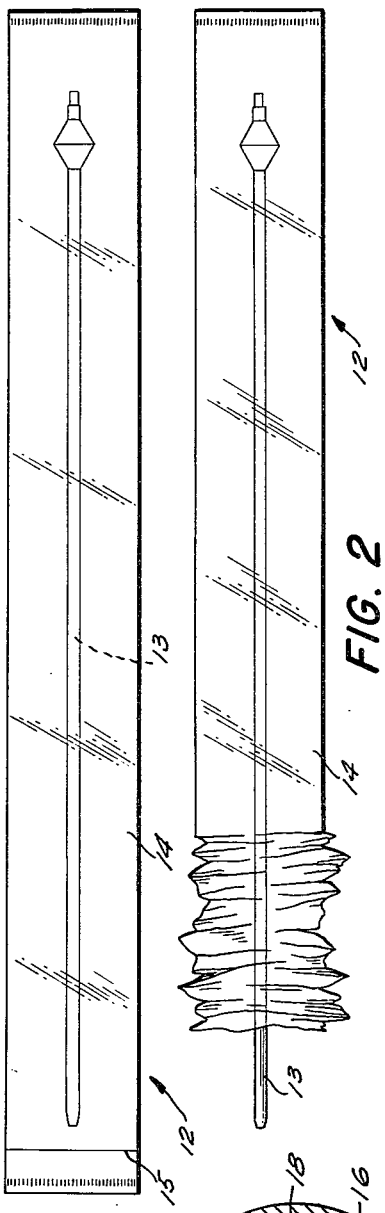
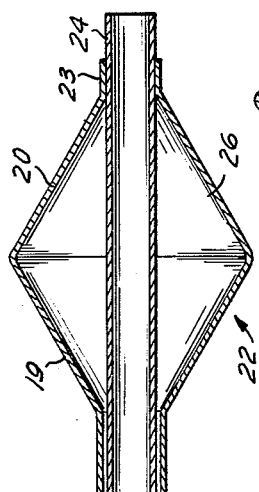
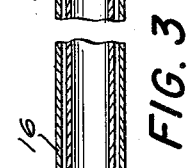
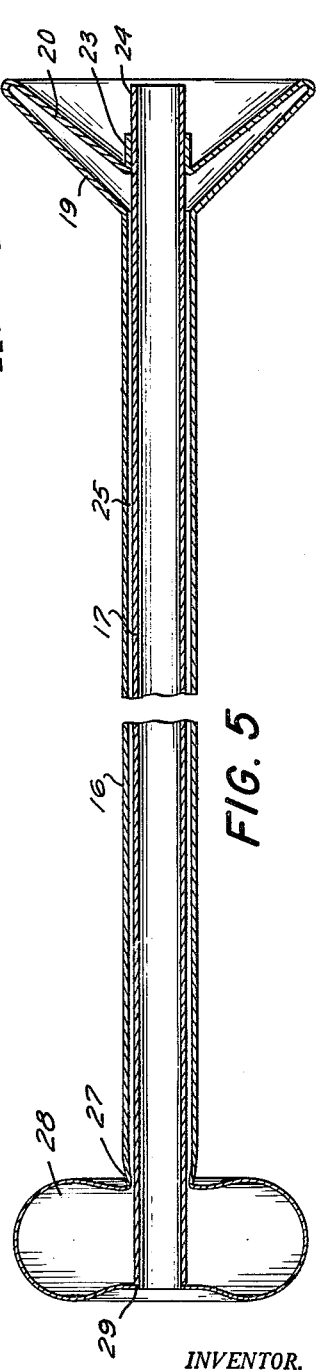
INVENTOR.
WILBUR R. KOEHN
BY
Curtis, Morris & Safford
ATTORNEYS INVENTOR.
WILBUR R. KOEHN
BY
Curtis, Morris & Safford
ATTORNEYS

United States Patent Office 3,050,066
Patented Aug. 21, 1962

3,050,066
RETENTION CATHETERS
Wilbur R. Koehn, 509 Hudson St., New York, N.Y.
Filed Dec. 31, 1958, Ser. No. 784,222
5 Claims. (Cl. 128—349)

The present invention relates to improvements in and method of making cathleters used for draining fluids from or supplying fluids to body cavities, and more particularly to a catheter of the type which is retained in the body for a period of time.

Retention catheters of different constructions have heretofore been proposed and one commonly used type known as a "Foley" catheter comprises a tube of rubber with a thin, elastic rubber membrane on the outer periphery of the tube which is adapted to expand under pressure. The Foley catheter tube has two separate lumens, one of which extends through the axis of the tube and the other of which extends to the elastic membrane. After the catheter has been inserted into a body cavity, a normal salt solution is injected through the lumen connected to the membrane by a separate syringe to expand the membrane and engage the walls of the body cavity, such as the bladder, to retain the catheter in place.

The Foley retention catheter is the best that is available and the one most commonly used, but has a number of faults which are recognized by the medical profession. One of the principal faults of a Foley retention catheter is that it is composed of rubber which is at least slightly toxic to human tissue and apt to produce inflammation in a comparatively short period of time. A second fault of such a catheter is that it must be used in accordance with sterile procedure which comprises sterilizing the catheter, syringe and fluid used; all materials adjacent the patient, such as linens, towels and the like; and used with sterile gloves, forceps, etc. to insert the catheter. A third fault of the Foley retention catheter is that the end of the catheter projects beyond the flexible, expanded membrane in the patient's body and constantly irritates the patient with accompanying discomfort. Furthermore, the projecting end of the catheter forces the inflated membrane against the neck portion of the urethra when inserted in the bladder which accentuates the irritation and inflammation at the very point where it should be avoided. A fourth fault of the Foley retention catheter is its relatively large diameter necessitated by a tube thickness to accommodate two lumens and give the required resistance to bending.

Another type of retention catheter also has been proposed which is made of a non-toxic material such as polyvinyl or polyethylene plastic with a plurality of lumens as in the Foley catheter and having a formed annular bag of a thin, flexible plastic surrounding the catheter and connected to one of the lumens. The formed bag, when deflated, drapes in an irregular, crinkled pattern over the outside of the catheter. This irregular, crinkled and radially projecting bag must be forced through a restricted passage in the body, such as the urethra. Fluid is then injected through the lumen connected to the bag in the same manner as in the Foley catheter to inflate the annular bag after the catheter has been inserted into a body cavity. The considerable difficulty of forcing such an irregularly folded and rough surfaced bag through the urethra and the trauma, pain and discomfort resulting therefrom have so limited the use of such a retention catheter that practically none are being used.

One of the objects of the present invention is to provide a non-toxic retention catheter which may be easily and quickly inserted without discomfort or pain beyond tolerable limits.

Another object is to provide a retention catheter tube of relatively small cross-section having a smooth outside surface with an inflatable bag at the inside thereof which is extended beyond the end of the tube and inflated after the tube has been inserted.

Another object is to provide a retention catheter which may be manually operated after the catheter has been inserted to form a retaining projection at the very end of the catheter for engaging the walls of the body cavity at a point remote from the neck portion.

Another object is to provide a sterile retention catheter in an hermetically sealed package which adapts the catheter to be inserted and inflated without additional sterile procedure.

Another object is to provide a novel method of making a retention catheter of the type indicated.

Still another object is to provide a retention catheter of the type indicated which is of relatively simple and compact construction, adapted for economical manufacture, of relatively small size to adapt it to be easily and quickly inserted with a minimum of discomfort, and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a front view of a catheter package incorporating the present invention and showing the weakened tear line at one end of the enclosing envelope;

FIGURE 2 is a view similar to FIGURE 1 showing the envelope open and the manner of exposing the end of the catheter;

FIGURE 3 is an enlarged longitudinal sectional view of the improved catheter and showing the position of the parts when the retention bag is deflated and retracted into the interior of the tube;

FIGURE 4 is a further enlarged transverse sectional view taken on line 4—4 of FIGURE 3 to show the relationship of the deflated bag at the interior of the catheter tube;

FIGURE 5 is a view similar to FIGURE 3 showing the relationship of the parts when the retention bag is extended and inflated;

Figure 9:
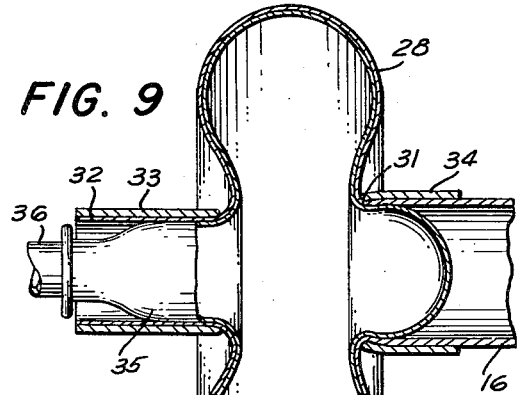
FIGURE 9 is a view similar to FIGURE 8 showing the balloon inflated to blow the outer tube radially between the retaining bands and controlled by the elastic material of the balloon to form a bag with a thin, flexible wall in the form of an annular retention ring.
Figure 10:
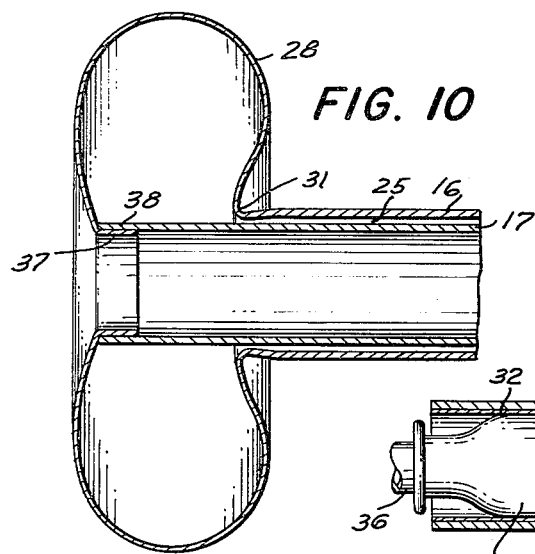
FIGURE 10 is a longitudinal sectional view showing the step of connecting the end of the outer tube beyond the bag to the end of the inner tube.
Figure 12:
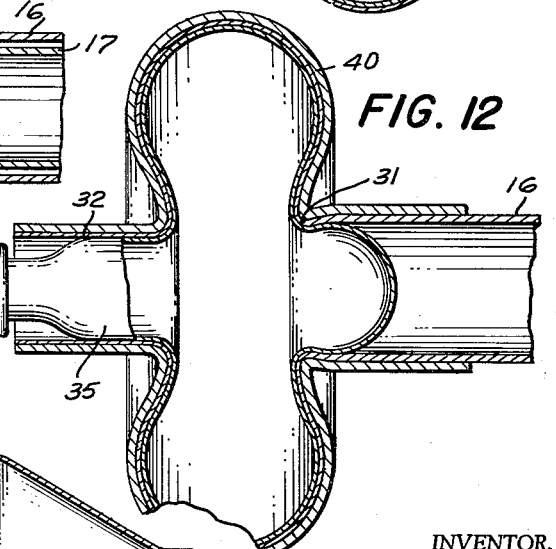
Figure 11:
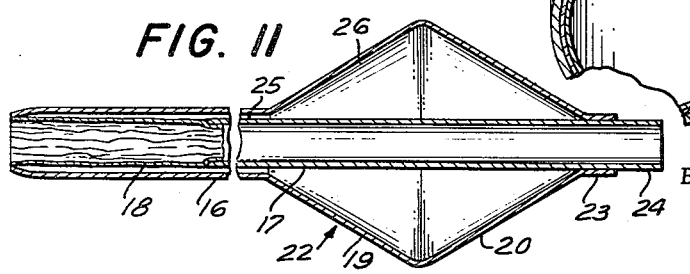

FIGURE 11 is a longitudinal sectional view showing the inner tube retracted relative to the outer tube to draw the deflated bag portion into the interior of the outer tube and the rearward end of the outer tube attached to the inner tube rearwardly of the bellows to complete the catheter; and FIGURE 12 is a view similar to FIGURE 9 showing a modification in which the end of the catheter is positioned in an annular mold to form the retaining enlargement at the end of the catheter.

Referring to the drawings, the retention catheter is supplied to the user as a self contained package unit 12 comprising a sterile catheter 13 of novel construction hermetically sealed in an enclosing envelope 14. The enclosing envelope 14 is composed of a thin, flexible, transparent plastic, such as polyethylene, and sealed at each end. Envelope 14 is formed with a weakened tear line 15 adjacent one end to adapt the envelope to be easily and quickly opened.

The end of the catheter 13 may be easily and quickly exposed beyond the opened end of the envelope 14 by manually sliding the end portion of the envelope rearwardly relative to the end of the catheter 13, as shown in FIGURE 2. It will be noted that the thin, flexible material of the envelope crumbles and folds as it is slid rearwardly by the fingers of one hand while the catheter 13 is held by pressure applied on the outside of the envelope by the fingers of the other hand. Thus, the end of the catheter 13 may be exposed without being touched by the hand and then held by the fingers of one hand which contact the exterior of the envelope only.

When the package 12 has been opened and the end of the envelope 14 forced rearwardly, as illustrated in FIGURE 2, the exposed end of the catheter 13 may be inserted into a body cavity, such as the bladder, through the urethra. After the end of the catheter 13 has been initially inserted into the urethra, the retracted portion of the envelope 14 may be extended forwardly to overlie the organ into which the end of the catheter has been inserted. The operator can view the catheter 13 through the envelope, due to the thin, transparent envelope, and proceed with the insertion of the catheter without touching either hand on either the catheter or organ into which it is inserted. Thus, the novel construction of the catheter package 12 permits the insertion of a catheter 13 without the requirement of an additional sterile procedure in the handling of the catheter which has been considered necessary heretofore.

The catheter 13 is composed throughout of non-toxic materials, such as polyethylene or polyvinyl plastic, and has relatively movable parts adapted to be operated to project a deflated bag from its interior and inflate the bag to form an annular retaining ring at the end of the catheter. As illustrated in FIGURE 3, the catheter 13 comprises an outer tube 16, an inner tube 17 having its forward end positioned rearwardly of the forward end of the outer tube and an annular sleeve 18 having a thin, flexible wall connected and sealed to the forward ends of the inner and outer tubes, respectively. Both the outer tube 16, inner tube 17 and sleeve 18 are composed of the non-toxic plastic material and are heat sealed to each other as later explained in the method of making the catheter.

The rearward portion of the outer tube 16 is formed with oppositely inclined conical walls 19 and 20 connected at an outer peripheral apex 21 to form an annular fold or bellows 22. The annular terminal end portion 23 of the outer tube 16 extends beyond the bellows 22 and is connected and sealed to the annular end portion 24 of the inner tube 17. The joint between the annular portions 23 and 24 of the outer and inner tubes 16 and 17 also may be heat sealed.

The inner tube 17 is of smaller diameter than the outer tube 16 to form an annular space 26 therebetween and this annular space and chamber 26 formed by the bellows 22 are filled with a non-toxic fluid. The fluid in the annular spaces 25 and 26 may be a gas or liquid, but preferably comprises a normal salt solution.

After the catheter 13 has been inserted through a passage, such as the urethra, to position the end 27 of the outer tube 16 in a body cavity, such as the bladder, the catheter is manually operated to project the annular sleeve 18 beyond the end of the outer tube 16 and inflate the sleeve to form an annular retaining ring or torus 28, see FIGURE 5. This operation is performed by holding the outer tube 16 between the forefinger and thumb of one hand forwardly of the bellows 22 and pressing the rearward end 24 of the inner tube 17 forwardly relative to the outer tube 16. Such relative movement projects the end 29 of the inner tube 17 beyond the end 27 of the outer tube 16, as illustrated in FIGURE 5. As the end 29 of the inner tube 17 moves forwardly it tends to push the thin, flexible sleeve 18 outwardly from the end of the outer tube 16. Simultaneously, the rearward conical wall 20 of the bellows 22 attached to the rearward end of the inner tube 17 moves toward the forward wall 19 of the bellows to at least partially collapse the chamber 27. As the annular chamber 26 of the bellows collapses it displaces fluid therein which flows longitudinally of the catheter 13 through the annular space 25 between the tubes and into the flexible annular sleeve 18. Thus, the forward movement of the end 29 of the inner tube 17 and the transfer of fluid into the sleeve 18 both operate to project the sleeve from the interior to the exterior of the outer tube 16. The fluid inflates the sleeve 18 of thin, flexible plastic to form the annular enlargement 28 at the end of the catheter, between the ends 27 and 29 of the outer and inner tubes 16 and 17. The sleeve 18 is preformed so that it has the torus shape illustrated in FIGURE 5 when inflated and is located at the terminal end of the catheter 13 without any projection therebeyond.

When the catheter 13 is manually operated from the position illustrated in FIGURE 3 to that illustrated in FIGURE 5, the walls 19 and 20 of the bellows 22 flex to permit the relative movement until the end portion 23 of conical wall 20 attached to the inner tube 17 passes through the center of a plane through the peripheral apex 21 and normal to the axis of the catheter. As the walls 19 and 20 of bellows 22 tend to retain their initial conical form, they produce a force tending to move the inner tube 17 forwardly. In other words, the rearward conical wall 20 buckles forwardly beyond the annular apex 21 to yieldingly retain the walls in the position illustrated in FIGURE 5. Such buckling of the rearward conical wall 20 toward the forward conical wall 19 displaces the fluid therein which is forced forwardly through the annular space 25 into the sleeve 18 between the ends 27 and 29 of the outer and inner tubes 16 and 17 to inflate the sleeve to its full extent and the inherent resiliency of the walls produces a force on the chamber 24 and fluid therein to insure complete inflation of the sleeve 18.

In the embodiment of the invention illustrated in FIGURE 3, the catheter 13 may have an outside diameter of .187 inch, the outer and inner tubes 16 and 17 a wall thickness of .010 inch and a spacing between the outer and inner tubes of .010 inch. Thus, the catheter has an outside diameter of three sixteenths of an inch, an inside diameter of approximately one eighth of an inch and a length of 16 inches. It will be understood, however, that the dimensions of the catheter may be varied for particular requirements. It is also pointed out that the difference in volume of the chamber 26 formed by the bellows 22 in the two positions illustrated in FIGURES 3 and 5 corresponds to the volume of the inflated torus or annular retaining ring 28; and that the rearward end portion of the conical wall 20 has a forward movement corresponding to the forward movement of the end 29 of the inner tube 17 to its extended position beyond the end 27 of the outer tube 16.

From the above it will be obvious that the present invention provides a catheter 13 having a smooth continuous outer surface which is inserted into a body cavity, such as the bladder through the urethra, to the required position. It will be noted that the annular enlargement 28 will engage the bladder remotely from the neck of the urethra because of its shape. It also will be noted that only the annular enlargement 28 engages the wall of the bladder without any projections beyond the enlargement which would tend to irritate the wall of the bladder opposite the neck portion.

The retention catheter 13 illustrated in FIGURES 1 to 5 may be made in the manner illustrated in FIGURES 6 to 12 of the drawings. In general, the method of making the catheter 13 comprises heating the end portion of the outer tube 16 to soften the plastic material of the tube and then expanding the softened portion by the application of pressure. The softened portion expands radially to form an annular enlargement and stretches the material of the tube wall to form a thin, flexible wall. The expansion of the tube wall is controlled by a sheath or band of a resilient material, such as rubber, which prevents unequal expansion of the tube wall, but, in turn, yields to form an annular enlargement or torus. The elastic band may be applied around the interior of the tube wall to engage and expand the wall of the tube uniformly, or may be applied around the exterior of the wall to resist its expansion. For purposes of description the method will be described below with the elastic band applied to the interior of the tube wall.

Figure 6:
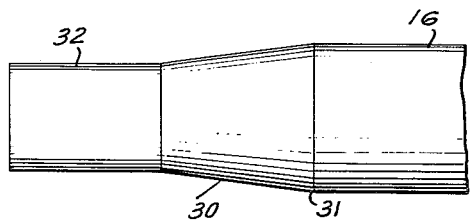
FIGURE 6 is a longitudinal sectional view showing how the end portion of the outer tube is tapered in the first step of making the catheter.

The first step of the method comprises forming a tapered portion 30 in the outer tube 16 adjacent one end as illustrated in FIGURE 6. The tapered portion 30 is made by heating the end portion of the tube 16 to render it plastic and then shaping it while plastic to form the tapered portion 30. The formed end portion of the tube 16 as shown in FIGURE 8 is provided with an annular portion 31 between the large end of the taper 30 and tube wall which is thinned down during the forming operation; and an extension 32 projecting outwardly from the small end of the taper which also is thinned down as by drawing and stretching.

Figure 7:
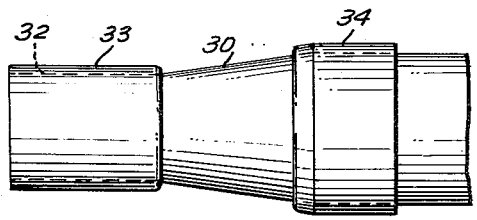
FIGURE 7 is a view similar to FIGURE 6 showing spaced retaining rings applied to the tapered portion of the tube.

After the end portion of the outer tube 16 has been formed with the taper 30, annular retaining bands 33 and 34 are applied over the tube 16 at the ends of the tapered portion 40 as shown in FIGURE 7. It will be observed that the outer band 33 overlies the reduced extension 32 of the tube 16 and the band 34 overlies the wall of the tube with a lip overlying the thinned down annular portion 31 at the large end of the taper 30. Thus, the tapered portion 30 of the tube is positioned between the retaining bands 33 and 34.

Figure 8:
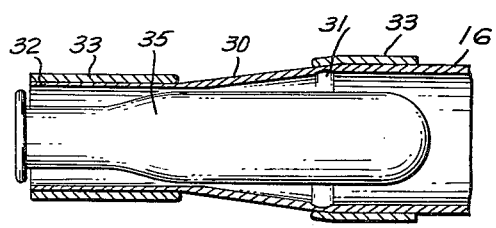
FIGURE 8 is a view similar to FIGURE 7 showing an elastic band in the form of an inflatable balloon inserted into the end of the tapered portion of the tube.

An elastic band 35, in the form of a deflated rubber balloon, is inserted into the open end of the outer tube 16 to underlie the tapered portion 30 as illustrated in FIGURE 8. The tapered end portion 30 between the retaining bands 33 and 34 is then heated to render it readily deformable. When the softened deformable tapered portion 30 is at the proper temperature, air under pressure is supplied to the interior of the balloon 35 by means of an air nozzle 36 to expand the balloon as illustrated in FIGURE 9. Balloon 35 expands between the retaining rings 33 and 34 to the annular shape illustrated. As the balloon 35 expands the surrounding tapered portion 30 of the tube 16 expands with the balloon and is stretched with a corresponding decrease in its wall thickness to provide a flexible sleeve 18. During this operation, the elastic wall of the balloon 35 controls its radial expansion uniformly around its entire periphery which, in turn, produces a uniform expansion of the tapered portion 30 of the tube 16 to produce a thin sleeve 18 of uniform thickness and having the shape of a torus. It will be observed in FIGURE 9 that the annular portion 31 of the outer tube 16 which underlies the lip of the retaining ring 34 retains its taper adjacent the enlargement, and that the wall of the annular portion gradually tapers from the thickness of the tube to the thickness of the sleeve 18.

After the enlargement 28 has been formed in the tube wall 16, the balloon 35 is deflated and withdrawn from the end of the tube. The extension 22 is cut off adjacent the enlargement to form a collar 37 which is turned inwardly, or buckled through, to the position illustrated in FIGURE 10. Inner tube 17 is then inserted into the outer tube 16 and its forward end 38 is telescoped over the collar 37 of the outer tube 16. The telescoped ends 37 and 38 of the outer and inner tubes 16 and 17 are then heat sealed to each other as by an induction heater. After the ends 37 and 38 of the tubes 16 and 17 are connected and sealed, the inner tube is retracted relative to the outer tube to draw the thin, flexible sleeve 18 into the end portion of the outer tube, as illustrated in FIGURE 11. It will be observed that the outer tube 16 has a smooth continuous surface throughout its length with a slightly tapered end of generally the same contour as a conventional catheter. The annular spaces 25 and 26 between the outer and inner tubes 16 and 17 are then filled with a fluid, such as a normal salt solution, and the end portion 23 of the outer tube is sealed to the rearward end portion 24 of the inner tube to complete the retention catheter.

The method of expanding the tapered portion 30 of the outer tube 16 may be modified in the manner illustrated in FIGURE 12. When this modified step of the method is used, the heated and softened end portion 30 of the outer tube 16 is inserted into a mold 40 having the shape of the annular retention torus to be formed. When pressure is applied to the interior of the balloon 35 it expands and stretches the tapered portion 30 of the tube 16 against the walls of the mold 40 to form the annular enlargement 28. After the annular projection or torus 28 is formed in the mold 40, as illustrated in FIGURE 12, the balloon 35 is deflated and withdrawn, the collar 37 sealed to the end of the inner tube 17 and the latter withdrawn with respect to the outer tube to draw the sleeve 18 into the end of the outer tube to complete the making of the catheter 13. The spaces 25 and 26 are filled with a fluid, such as a normal salt solution, and the overlapping end portions 23 and 24 of the outer and inner tubes sealed to each other.

While the method has been described with the elastic band in the form of an inflatable balloon applied at the interior of the tapered portion 30 of the outer tube 16, it is to be understood that the elastic band or sheath may be wrapped around the outer periphery of the tapered portion of the tube wall. The resistance of the surrounding band controls the expansion of the tapered portion to prevent the material of the tube wall from yielding at one area to a greater degree than at other areas due to softer spots in the tube wall. The annular enlargement 28 also may be formed in a mold 40 as illustrated in FIGURE 12 when the resilient band is applied around the outer periphery of the tube 16. Also the tube and band may be expanded either by the application of pressure at the interior of the tube or drawing a vacuum in the mold 40.

It will be understood that the catheter 13 is made under sanitary conditions, inserted in the envelope 14 and then sterilized after which the envelope is sealed to form the hermetically sealed package 12. If the envelope 14 is of a material which is pervious to water vapor the envelope may be further enclosed in a vapor proof wrap such as laminated foil. The catheter package 12 is then ready for shipment or storage.

It will now be observed that the present invention provides a non-toxic retention catheter which may be easily and quickly inserted into a body cavity. It also will be observed that the present invention provides a manually operable retention catheter of relatively small cross-section having a smooth outside surface with an inflatable bag which may be extended from the interior of the catheter and inflated after the catheter has been inserted to retain the catheter in place. It also will be observed that the present invention provides a sterile retention catheter in a hermetically sealed package which permits insertion of the catheter into a body cavity without additional sterile procedure. It also will be observed that the present invention provides a novel method of making a retention catheter of improved construction. It will still further be observed that the present invention provides a retention catheter of the type indicated which is of a relatively simple and compact construction, economical to manufacture and one which is reliable in operation.

While a single embodiment of the catheter is herein illustrated and described it will be understood that changes may be made in the construction and arrangement of elements and in the steps of the method of making without departing from the spirit or scope of the invention. Therefore, without limitation in this respect, the invention is defined by the following claims:

I claim:

1. A retention catheter comprising an outer tube, an inner tube mounted to slide longitudinally in the outer tube, an annular sleeve of a thin, flexible material connected between the ends of the inner and outer tubes and located wholly within the outer tube when the inner tube is retracted relative thereto, said inner tube being movable relative to the outer tube to project the sleeve from the end of the outer tube, means for supplying a fluid under pressure between the inner and outer tubes to inflate the sleeve, and said sleeve being formed to produce an annular enlargement at the end of the outer tube when inflated.

2. A retention catheter comprising inner and outer tubes movable longitudinally relative to each other, a tubular sleeve having its ends connected to the adjacent ends of the inner and outer tubes and sealed thereto around the peripheries of the tubes, said sleeve being shaped to form a torus and being drawn into and wholly enclosed in the outer tube when the inner tube is retracted, said inner tube being movable relative to the outer tube to position its end beyond the end of the outer tube and position the sleeve therebetween, and means operated by the relative movement of the inner and outer tubes for forcing a fluid between the tubes and against the sleeve to inflate the latter to its torus shape between the ends of the inner and outer tubes.

3. A retention catheter comprising inner and outer tubes of a non-toxic plastic material, said inner tube having an outside diameter less than the inside diameter of the outer tube to adapt it to slide therein, one end of the outer tube being connected and sealed to the inner tube, an annular sleeve of a thin, flexible non-toxic plastic material connected and sealed to the opposite ends of the inner and outer tubes, respectively, said sleeve being projected from the end of the outer tube when the inner tube is slid relative thereto, the wall of the outer tube adjacent the connected ends being shaped to form a reservoir for fluid, said reservoir being connected to the sleeve through the space between the inner and outer tubes, and the walls of the reservoir being collapsed when the inner tube is slid relative to the outer tube to transfer fluid from the reservoir to inflate the sleeve and form an annular enlargement at the end of the outer tube.

4. A retention catheter in accordance with claim 1 in which the ends of the inner tube when in retracted position are offset with respect to the ends of the outer tube, the rearward end of the outer tube being attached and sealed to the periphery of the inner tube, the wall of the outer tube having oppositely inclined conical walls forming a bellows for yieldingly holding the inner tube retracted, the oppositely inclined conical walls flexing to overlapping relationship when the inner tube is pressed forwardly to limit the extension of the end of the inner tube beyond the end of the outer tube.

5. A retention catheter in accordance with claim 4 in which the bellows in the outer tube cooperates with the inner tube to form a reservoir therebetween, fluid in the reservoir and space between the inner and outer tubes, and the volume of the reservoir decreasing as the walls of the bellows are buckled from oppositely inclined to overlapping relationship to transfer the fluid required to inflate the sleeve when the end of the inner tube is extended beyond the end of the outer tube.

References Cited in the file of this patent

UNITED STATES PATENTS

| | | |
|---|---|---|
| 741,360 | Moseley | Oct. 13, 1903 |
| 1,235,142 | Ichilian | July 31, 1917 |
| 2,213,210 | Egbert | Sept. 3, 1940 |
| 2,487,630 | Alvarez | Nov. 8, 1949 |
| 2,634,856 | Perkins | Apr. 14, 1953 |
| 2,787,023 | Hagen | Apr. 2, 1957 |
| 2,810,934 | Bailey | Oct. 29, 1957 |
| 2,845,930 | Brown | Aug. 5, 1958 |
| 2,854,982 | Pagano | Oct. 7, 1958 |
| 2,902,146 | Doherty | Sept. 1, 1959 |
| 2,919,697 | Kim | Jan. 5, 1960 |